(12) United States Patent
Takeda et al.

(10) Patent No.: US 7,841,670 B2
(45) Date of Patent: Nov. 30, 2010

(54) VEHICLE WHEEL

(75) Inventors: Kazuo Takeda, Aichi-ken (JP);
Tomokazu Nishikawa, Aichi-ken (JP);
Daiichiro Kawashima, Aichi-ken (JP);
Tatsuya Oba, Aichi-ken (JP); Tetsuya Arakawa, Aichi-ken (JP); Koji Murakami, Tokyo (JP); Kenichi Sakanoshita, Tokyo (JP)

(73) Assignees: Toyoda Goset Co., Ltd., Aichi-pref (JP);
Topy Kogyp Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/656,383

(22) Filed: Jan. 28, 2010

(65) Prior Publication Data

US 2010/0133894 A1    Jun. 3, 2010

Related U.S. Application Data

(63) Continuation of application No. 12/223,448, filed as application No. PCT/JP2007/051794 on Feb. 2, 2007, now abandoned.

(30) Foreign Application Priority Data

Feb. 3, 2006  (JP) ............................... 2006-027333
Nov. 27, 2006  (JP) ............................... 2006-318737

(51) Int. Cl.
*B60B 7/06* (2006.01)
(52) U.S. Cl. ........................... 301/37.102; 301/37.371; 301/37.107

(58) Field of Classification Search ............. 301/37.01, 301/37.29, 37.102, 37.28, 37.371, 37.106, 301/37.107, 37.108, 37.109, 37.41, 37.42, 301/37.43, 64.101, 64.102, 64.704, 64.705, 301/67, 73, 74, 65, 63.107, 63.108, 64.202, 301/9.1, 6.3, 6.91, 54, 76, 78; 152/31, 72, 152/84; D12/204, 206, 213
See application file for complete search history.

(56) References Cited

U.S. PATENT DOCUMENTS 1,338,072 A * 4/1920 Craft ........................... 301/25

(Continued)

FOREIGN PATENT DOCUMENTS

EP    0 475 915 A1    3/1992

(Continued)

OTHER PUBLICATIONS

PCT International Search Report mailed on Mar. 20, 2007 for the corresponding International patent application No. PCT/JP2007/051794 (both in English and Japanese).

(Continued)

*Primary Examiner*—S. Joseph Morano
*Assistant Examiner*—Kip T Kotter
(74) *Attorney, Agent, or Firm*—Posz Law Group, PLC

(57) ABSTRACT

The degree of freedom in design is increased while maintaining strength by enabling a decorative member to be disposed without thinning a wheel main body.

A wheel is made up of a wheel main body 1 which is made up of a rim portion 10 and a disc portion 11 and which has a vent hole 141 in the disc portion 11 and a decorative member 2 made from a resin which is held in at least the disc portion 11 and is observed from the vent hole 141. Since the decorative member 2 is observed in the vent hole 141, the wheel main body 1 including spoke portions 14 does not have to be thinned. In addition, since the design of the decorative member is observed in cooperation with the design of the disc portion 11, the degree of freedom in design is increased.

4 Claims, 15 Drawing Sheets

U.S. PATENT DOCUMENTS

| | | | |
|---|---|---|---|
| 1,487,904 | A | 3/1924 | Walters et al. |
| 1,706,297 | A | 3/1929 | Wardlow |
| 1,928,897 | A * | 10/1933 | Kay .......................... 301/13.1 |
| 2,123,099 | A | 7/1938 | Eksergian |
| 3,579,408 | A | 5/1971 | Dowhan |
| 4,319,785 | A | 3/1982 | Sato et al. |
| 4,693,520 | A | 9/1987 | Brown |
| 4,930,843 | A | 6/1990 | Lewis |
| 5,540,485 | A | 7/1996 | Enders |
| 5,577,809 | A | 11/1996 | Chase |
| 5,636,906 | A | 6/1997 | Chase |
| 5,803,552 | A | 9/1998 | Kato et al. |
| 6,439,671 | B1 | 8/2002 | Lehnhardt et al. |
| 6,663,189 | B2 | 12/2003 | Enomoto et al. |
| 6,805,413 | B2 | 10/2004 | Fitzgerald |
| 7,055,915 | B2 | 6/2006 | Fitzgerald |
| 7,347,502 | B2 | 3/2008 | Courtney et al. |
| 7,361,296 | B2 | 4/2008 | Adrian |
| 7,455,165 | B2 | 11/2008 | Lawless |
| 2003/0047987 | A1 | 3/2003 | Enomoto et al. |

FOREIGN PATENT DOCUMENTS

| | | |
|---|---|---|
| JP | 3-40101 | 4/1991 |
| JP | A-6-72101 | 3/1994 |
| JP | 6-85101 | 12/1994 |
| JP | A-9-193601 | 7/1997 |
| JP | A-9-226301 | 9/1997 |
| JP | A-2002-120501 | 4/2002 |
| JP | A-2002-205502 | 7/2002 |
| JP | A-2003-34101 | 2/2003 |
| JP | A-2003-118302 | 4/2003 |
| JP | A-2003-159901 | 6/2003 |
| JP | A-2005-324799 | 11/2005 |
| WO | WO 2004/041551 A2 | 5/2004 |

OTHER PUBLICATIONS

Extended European Search Report dated May 4, 2010 issued from the European Patent Office in the corresponding European patent application No. 07713788.3.

* cited by examiner

VEHICLE WHEEL

CROSS REFERENCE TO RELATED APPLICATIONS

This application is a continuation application of U.S. patent application Ser. No. 12/223,448, which was filed on Jul. 31, 2008 (371 filing date of Oct. 30, 2008) and which is a U.S. national stage application of PCT/JP2007/051794 filed on Feb. 2, 2007.

TECHNICAL FIELD

The present invention relates to an automotive wheel and more particularly to a wheel having a decorative member made of a resin.

BACKGROUND ART

Many automotive wheels on which tires are mounted are made from a light-alloy such as aluminum and magnesium alloys with a view to increasing fuel economy. These light-alloy wheels are made up of a rim portion and a disc portion, and a further weight reduction is attained by forming vent holes in the disc portion.

By making use of its metallic gloss, the light-alloy wheel generally represents its design only by a wheel main body without using a wheel cap. However, when the designed is made to be represented only by the wheel main body, in the event that a design surface is damaged, the wheel main body has to be replaced, which is uneconomical. In addition, there are some designs which cannot meet the strength that the wheel should maintain, and it is difficult to embody such designs.

Then, Patent Document No. 1 and Patent Document No. 2 propose decorative light-alloy wheel in which a decorative member made from a resin is detachably mounted on a wheel main body. For example, a decorative light-alloy wheel described in Patent Document No. 1, a recess is formed on a surface of a wheel main body including spoke portions, and a decorative member made from a resin is mounted in the recess in a replaceable fashion. In addition, in a decorative light-alloy wheel described in Patent Document No. 2, a decorative cover made from a resin is mounted on the wheel in a replaceable fashion by projecting portions which project from the decorative cover being fitted in through holes formed in spoke portions via elastic bushes.

In the decorative light-alloy wheel described in Patent Document No. 1, however, since the recess is formed in the spoke portions, although it is effective to reduce the weight, the depth of the recess is limited in consideration of strength, causing a problem that the degree of freedom in design is low. In addition, in the decorative light-alloy wheel above, in many cases, a surface of the decorative member is desired to become substantially level with a surface of the wheel main body when the decorative member is partially disposed. In this case, the spoke portions have to be made thinner to an extent equaling the thickness of the decorative member, and since the strength is decreased to such an extent that the spoke portions are thinned, a problem also arises that the degree of freedom in design is decreased.

Patent Document No. 1: JP-A-2003-159901
Patent Document No. 2: JP-A-2005-324799

DISCLOSURE OF THE INVENTION

Problem that the Invention is to Solve

The invention has been made in view of the situations described above and a problem to be solved by the invention is to increase the degree of freedom in design while maintaining the strength by enabling the decorative member to be disposed without reducing the thickness of the wheel main body.

Means for Solving the Problem

A vehicle wheel of the invention includes a wheel main body which is made up of a rim portion and a disc portion and which has a vent hole in the disc portion and a decorative member made from a resin which is held in at least the disc portion and is observed from the vent hole.

According to the vehicle wheel of the invention, the decorative member is provided in such a manner as to be observed from the vent holes. Consequently, the decorative member can be provided irrespective of spoke portions or the rim portion, and a wheel main body does not have to be thinned. In addition, the design of the decorative member appears in cooperation with the design of the disc portion. Namely, according to the vehicle wheel of the invention, the degree of freedom in design is increased while maintaining the strength that the wheel should maintain.

A plurality of fixed portions are formed on the decorative member, and by the fixed portions being engaged with a plurality of fixing portions formed on the wheel main body, the decorative member is desirably held integrally to the wheel main body.

Where the decorative member is held to the wheel main body by the plurality of fixed portions being brought into engagement with the plurality of fixing portions, the movement of the decorative member can be restricted in an ensured fashion while running, thereby making it possible to prevent the damage of the decorative member.

The decorative member is desirably formed into a substantially U-shape in cross section which has a hollow portion. By configuring the decorative member in this way, the rigidity of the decorative member is increased compared with a case where the decorative member is formed into a flat plate-like shape. Furthermore, in the event that a rib is provided which crosses the hollow portion, the rigidity is increased further by the cross sectional shape effect and the rib, whereby the decorative member can withstand stress exerted thereon from the wheel main body while running.

In the event that a construction is adopted in which a fixed portion is formed on a boss portion formed on the rib and the rib and the boss portion are spaced apart from a bottom portion of the hollow portion, it becomes possible to prevent the generation of a sink mark on a design surface which lies on a rear surface side of the bottom portion of the hollow portion, thereby the design property of the decorative member being increased.

In the event that the fixed portions are formed further radially inwards than a circumferential edge portion of the decorative member, engagement portions between the fixed portions and the fixing portions are prevented from appearing when the wheel is seen from the front.

Advantage of the Invention

According to the invention, the degree of freedom in design can be increased while maintaining the strength that the vehicle wheel should maintain.

Figure 1:
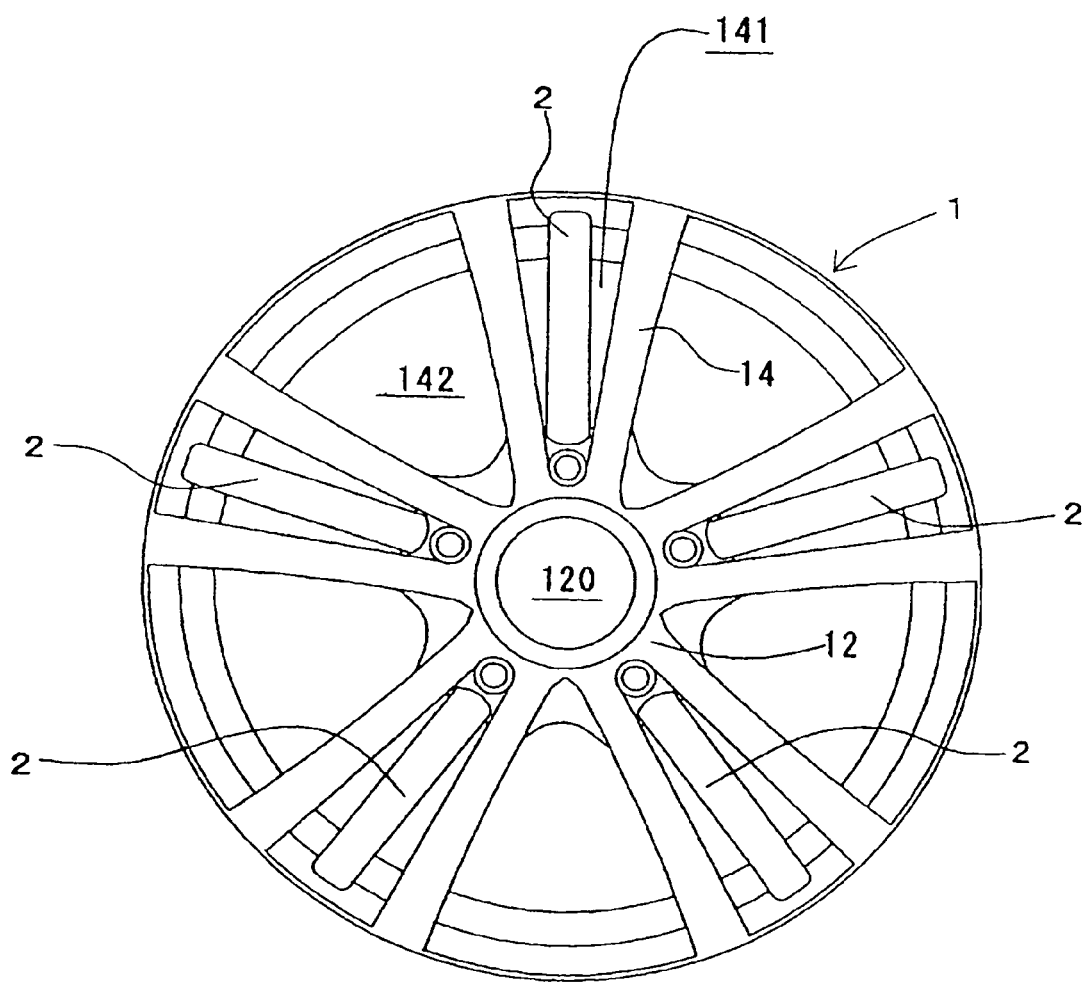
FIG. 1 is a front view of a wheel according to an embodiment of the invention.

DESCRIPTION OF REFERENCE NUMERALS 1 wheel main body; 2 decorative member; 3 bolt member (locking member); 10 rim portion; 11 disc portion; 12 hub portion; 14 spoke portion; 21 rib; 30 nut; 101 projection; 103 outer peripheral engagement hole; 122 thinned portion; 123 outer peripheral engagement hole; 141 first vent hole; 142 second vent hole.

Best Mode for Carrying Out the Invention

A vehicle wheel of the invention is made up of a wheel main body and a decorative member. The wheel main body can use one made from a light alloy such as an aluminum alloy and a magnesium alloy. The wheel main body is made up of a rim portion on which bead portions of a tire sit and a disc portion and has vent holes in the disc portion.

The disc portion includes a hub portion having stud holes and an outer edge. A spoke portion, a mesh portion or a plate portion is formed between the hub portion and the outer edge, and they are called a spoke type disc, a mesh type disc and a dish type disc, respectively. The wheel of the invention is such as to have vent holes in the disc portion, and in the spoke type disc, vent holes can be formed between adjacent spokes. In the mesh type disc, spaces in the mesh can be made to constitute vent holes. Furthermore, in the dish type disc, through holes formed in the plate portion can be made to constitute vent holes.

The decorative member is preferably formed from a resin from the view point of weight reduction and is desirably formed from a hard resin. As the hard resin, for example, ABS, PP, PA, Noryl resin and polycarbonate-ABS alloy resin are raised as examples. In addition, reinforced resins can be used which are reinforced by various types of fillers such as carbon fibers, glass fibers or ceramic powder.

As a decoration method of the decorative member, a known method such as electrolessly plating, deposition or painting can be used, and as its design, metallic gloss, body paint color and the like are raised.

A plurality of fixed portions are formed on the decorative member. As this fixed portion, bolt, pin, locking claw, engagement hole and the like are raised as examples. With a single fixed portion, since there is a fear that the decorative member is displaced by virtue of centrifugal force produced by rotation when running and comes into interference with the spoke portion, two or more fixed portions are formed. The fixed portions are locked on a plurality of fixing portions formed on the wheel main body, respectively. By this, the decorative member is held integrally on the wheel main body and no displacement is caused by the centrifugal force.

Although the decorative member may be formed into a solid body, to impart rigidity thereto and reduce the weight thereof, the decorative member is desirably formed into a substantially U-shape in cross section having a hollow portion. Here, the substantially U-shape cross section means a U-shaped cross section, a V-shaped cross section, an angularly U-shaped cross section and the like. However, in the event that the decorative member is formed into a substantially U-shape cross section having a hollow portion, there is a fear that since due to insufficient strength, deformation or failure is caused while in use. Then, the decorative member desirably includes a rib which crosses the hollow portion. The rigidity can be ensured by the rib while suppressing the increase in weight to a least level.

In the event that the decorative member is formed into the substantially U-shape having the hollow portion, an open side of the U-shaped cross section constitutes a rear surface side, and a raised front surface side of a bottom portion of the U-shaped cross section constitutes a designed surface. Consequently, it is considered that, for example, a boss portion is formed on a bottom surface of the U-shaped cross section and a bolt or the like is fixedly held on the boss portion to constitute a fixed portion. In this case, however, since the boss portion becomes thick, there is caused a problem that a sink mark is produced on the designed surface which is a rear surface side of the boss portion at the time of molding.

Then, a boss portion is formed on the rib itself, and the rib and the boss portion are desirably formed in such a manner as to be spaced apart from the bottom portion of the hollow portion using a slide core. By this, the production of a sink mark on the designed surface can be avoided, thereby the design property of the decorative member being increased. Then, a bolt, clip or the like is fixedly held on the boss portion, so as to constitute a fixed portion.

In addition, in the event that the rib and the boss portion are formed in such a manner as to be spaced apart from the bottom portion of the hollow portion, there may be caused a situation in which foreign matters such as water and mud enter the hollow portion of the decorative member and move in association with the rotation of the wheel to thereby generate abnormal noise. To prevent a problem like this, it is also preferable to form a plate-like portion which extends from the rib towards the bottom surface of the decorative member. The intrusion of foreign matters can be prevented to some extent by this plate-shaped portion.

The fixed portions are preferably formed further radially inwards than a circumferential edge portion of the decorative member. By this configuration, when the wheel is seen from the front, the engagement portions with the fixing portions are made difficult to be visualized, thereby the design property being increased further. As has been described above, in the event that the boss portion is formed on the rib, the fixed portion is inevitably formed further radially inwards than the circumferential edge portion of the decorative member.

The fixing portions with which the fixed portions are brought into engagement can be provided on the hub portion or the spoke portion. In addition, a projection or a thinned portion which extends into the vent hole from the hub portion, the spoke portion or the rim portion is formed, and the fixing portion may be formed on the projection or thinned portion. As this occurs, the circumferential edge portion of the decorative member is desirably configured to cover the projection or the thinned portion so as to make the projection difficult to be visualized.

For example, the projections or the thinned portions as the fixing portions are desirably formed as a pair which confronts the decorative member so that the projections or the thinned portions are hidden under the decorative member and hence is not visualized when seen from the front. Namely, in the event that the decorative member has a general straight-line shape, the projections or the thinned portions are desirably formed as a pair in positions which confront each other in a radial and/or a circumferential direction of the wheel main body. In addition, in the case of the decorative member having a curved shape, the projections or the thinned portions are desirably formed as a pair in a direction which follows the curve.

Embodiment

Hereinafter, the invention will be described specifically based by an embodiment.

Embodiment 1

Figure 5:
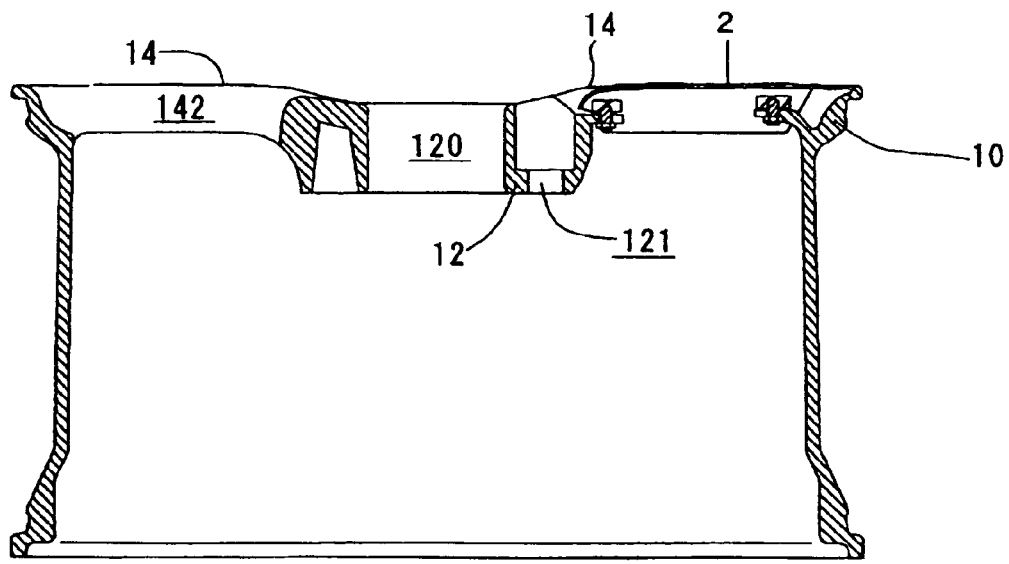
FIG. 5 is a sectional view of the wheel according to the embodiment of the invention.

FIG. 1 shows a front view of a vehicle wheel of the embodiment, and FIG. 5 shows a sectional view thereof. This wheel is made up or a wheel main body 1 made of an aluminum alloy and decorative members 2 which are injection molded from a polycarbonate-ABS alloy resin.

Figure 2:
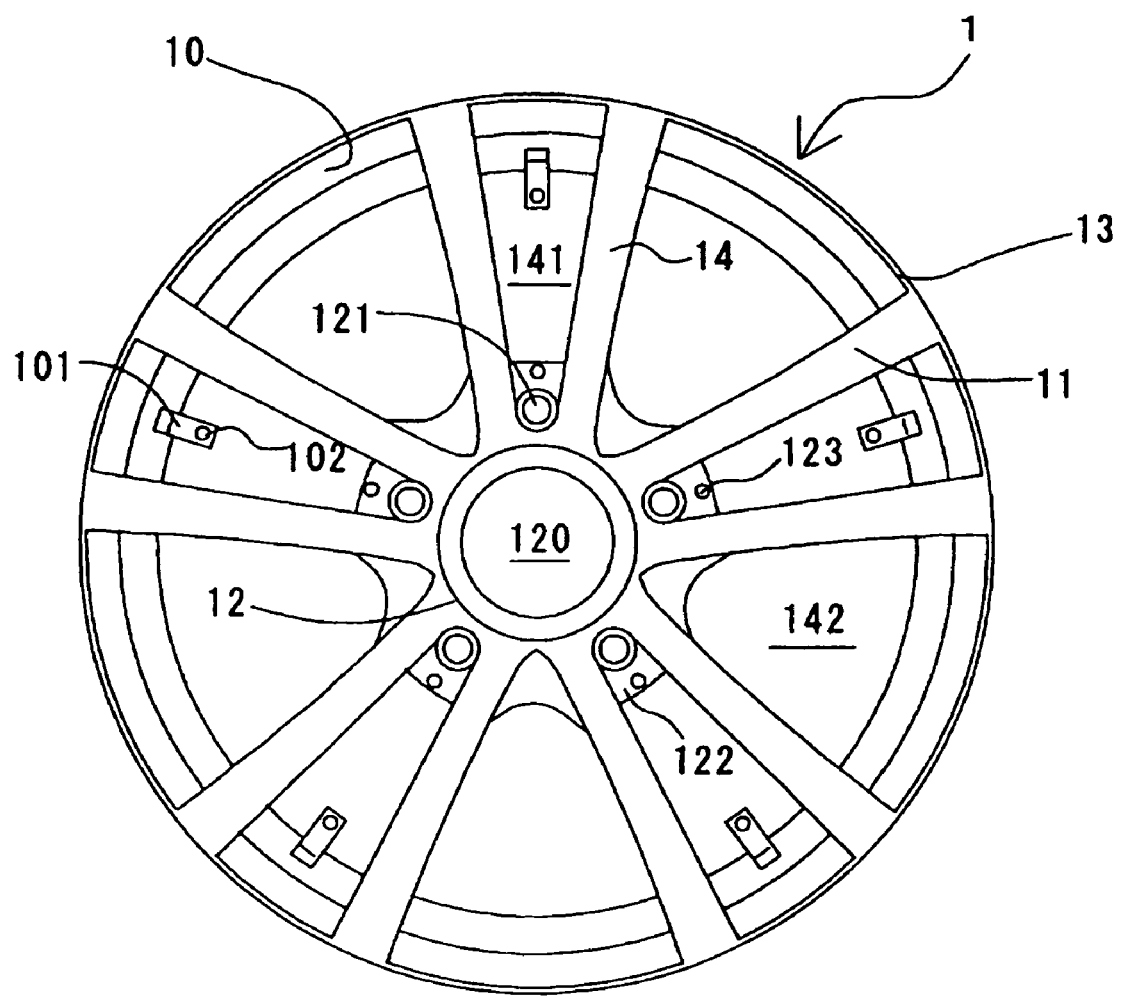
FIG. 2 is a front view of a wheel main body used in the wheel according to the embodiment of the invention.

The wheel main body 1 shown in FIG. 2 is made up of a substantially cylindrically tubular rim portion 10 where bead portions of a tire sit and a disc portion 11 which forms a designed surface. The disc portion 11 has a hub portion 12 to which an axle is attached, an outer circumferential edge 13 which constitutes part of the rim portion 10, and a plurality of spoke portions 14 which connect the outer edge 13 with the hub portion 12. A hub hole 120 is formed in the hub portion 12, and a plurality of bolt or stud holes 121 are formed round the hub hole 120 through which hub bolts for fixing the wheel to a hub of the axle are passed. In addition, in this embodiment, although the rim portion 10 and the disc portion 11 are formed integrally, a wheel main body can also be used in which a rim portion 10 and a disc portion 11, which are formed separately from each other, are connected together.

Five pairs of spoke portions 14 are formed, each pair being made up of two spoke portions 14, and the respective pairs of spoke portions 14 extend radially from the hub portion 12 into a star shape. A first vent hole 141 is formed between the two spoke portions 14 which constitute the pair. In addition, a second vent hole 142 is formed adjacent to the first vent hole 141 between the pairs of spoke portions 14.

Thinned portions 122 are formed radially outwards of the stud holes 121 in the hub portion 12 in such a manner as to extend into the first vent holes 141, respectively, and radially inward engagement holes 123 pierce the thinned portions 122 in a thickness direction (an axle direction), respectively. In addition, projections 101 are formed which extend from the rim portion 10 towards the first vent holes 141, respectively, and radially outward engagement holes 102 pierce the projections at distal ends thereof in the thickness direction (the axle direction), respectively.

Figure 3:
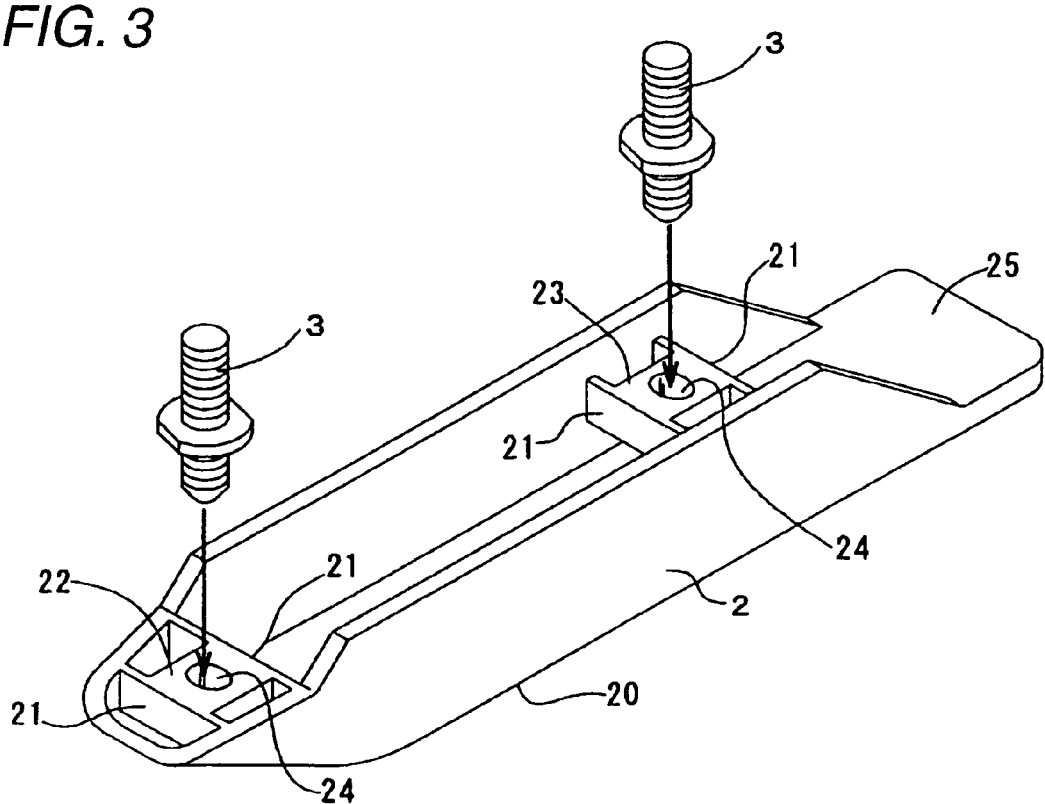
FIG. 3 is a perspective view of a decorative member used in the wheel according to the embodiment of the invention.
Figure 4:
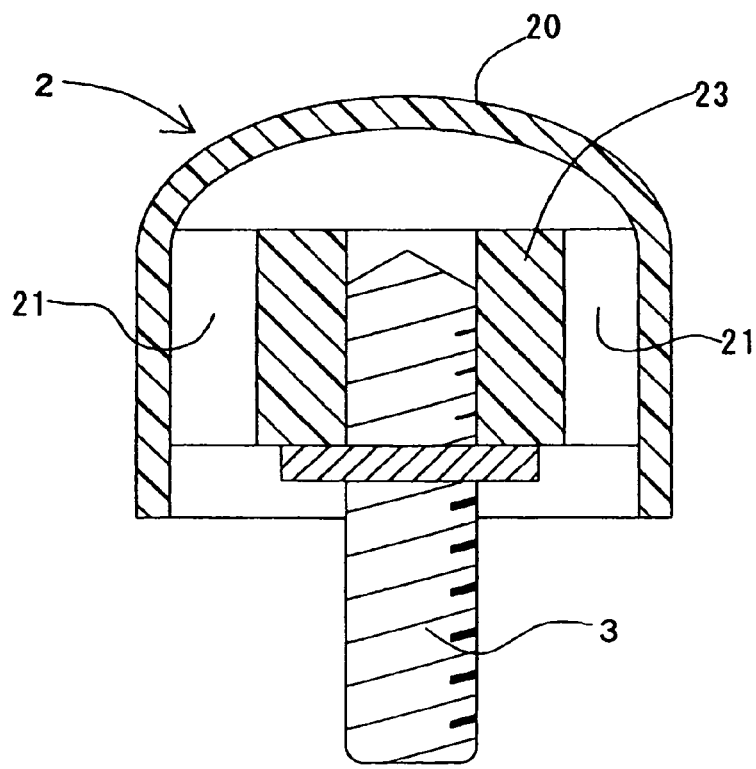
FIG. 4 is a sectional view of the decorative member used in the wheel according to the embodiment of the invention.

A substantially boat-shaped decorative member 2 is disposed in each of the first vent holes 141 in such a manner as to extend in the radial direction. The decorative member 2 shown in FIGS. 3 and 4 is formed into a substantially U-shape in cross section which has a hollow portion, and a raised front surface side of a bottom portion of the U-shaped cross section is observed and constitutes a designed surface 20. The designed surface 20 is treated by electrolessly plating to exhibit a metallic gloss design.

Two or a pair of ribs 21 are formed in the hollow portion of the decorative member at the front and rear thereof in such a manner as to cross the hollow portion in a bridge-like fashion, and between the pair of ribs 21, boss portions 22, 23 are formed integrally with the ribs 21, respectively. The ribs 21 and the boss portions 22, 23 are formed in such a manner as to be spaced apart from a bottom surface of the hollow portion, so as to prevent the generation of a sink mark on the designed surface 20. In addition, mounting holes 24 are formed in the boss portions 22, 23, respectively, and one end of a metallic bolt member 3 is fixed in place in each mounting hole 24 as a tapping screw to constitute a fixed portion. Furthermore, a flat plate portion 25 is formed to the rear of the boss portion 23.

Figure 6:
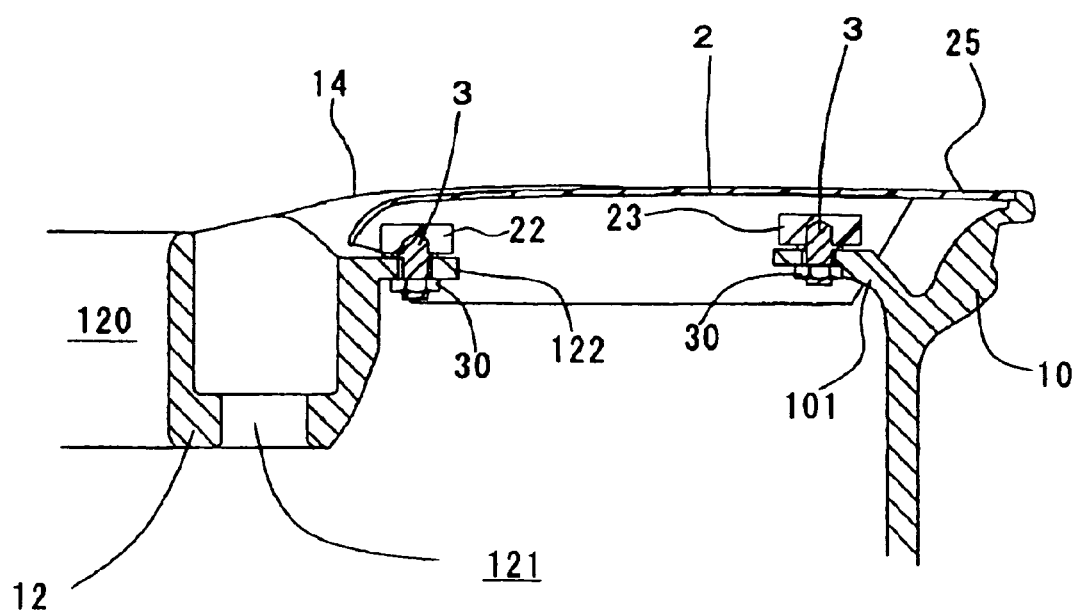
FIG. 6 is an enlarged sectional view of a main part of the wheel according to the embodiment of the invention.

As is shown in FIGS. 5 and 6, the bolt member 3 fixed in the boss portion 22 is inserted through the radially inward engagement hole 123 (the fixing portion) and is fastened to the thinned portion 122 by means of a nut 30. On the other hand, the bolt member 3 fixed in the boss portion 23 is passed through the radially outward engagement hole 102 (the fixing portion) is fastened to the projection 101 by means of a nut 30. In addition, the flat plate portion 25 extends to a side surface (the outer edge 13 of the disc portion) of the rim portion 10 to cover part of the side surface (the outer edge 13 of the disc portion) of the rim portion 10.

Namely, according to the wheel of this embodiment, the decorative members 2 which has the same metallic gloss design as that of the spoke portions 14 are disposed in such a manner as to extend radially into the first vent holes 141. Consequently, a star-shaped design is realized in which the pair of spoke portions 14 and the decorative member 2 form a spoke shape made up of three spokes and the second vent holes 142 are formed between the spoke shapes each made up of three spokes. In addition, since the decorative members 2 are made from resin, a weight reduction can be attained compared with a case where the same design is formed from an aluminum alloy, this contributing to an improvement in fuel economy. Furthermore, the radially inward engagement holes 123 and the radially outward engagement holes 102 are covered by the decorative members 2 having the U-shaped cross section, a high design property is provided in which the mounting portions become invisible from the front.

In addition, since the decorative member 2 is fastened to the wheel main body 1 at the two, front and rear locations, the decorative member 2 can withstand sufficiently a load exerted thereon while running, and the replacement thereof is facilitated. Additionally, since the decorative member 2 is disposed in the first vent hole 141 lying between the pair of spoke portions 14, the spoke portion 14 does not have to be thinned. Consequently, the degree of freedom in design is increased while maintaining the sufficient strength that the wheel should maintain. Furthermore, the decorative member can be made to have a high degree of freedom in coloring, thereby making it possible to produce a novelly designed wheel that cannot be obtained when a wheel is produced only through casting or forging can be obtained in cooperation with the alloy wheel main body.

Embodiment 2

Figure 7:
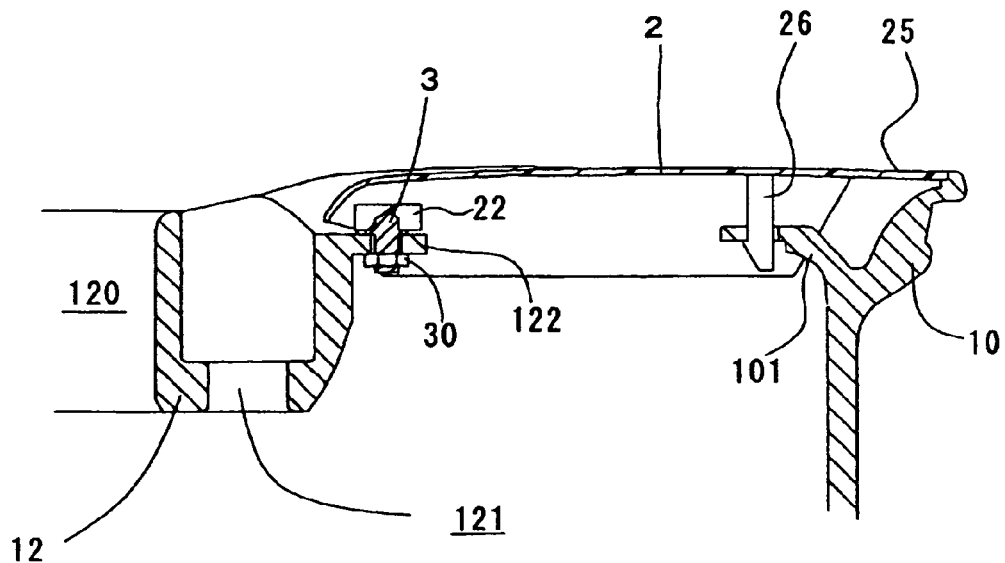
FIG. 7 is an enlarged sectional view of a main part of a wheel according to a second embodiment of the invention.

A wheel of this embodiment shown in FIG. 7 is similar to Embodiment 1 except that the construction of a decorative member 2 is different.

In the decorative member 2, a rod-like pawl portion 26 is provided in the position of the boss portion 23 of the decorative member 2 of Embodiment 1 in such a manner as to project therefrom, and a distal end of the claw portion 26 is brought into engagement with a radially outward engagement hole 102 formed in a distal end of a projection 101. A boss portion 22 side is similar to Embodiment 1, and a bolt member 3 fixed thereto is inserted through a radially inward engagement hole 123, so as to be fastened to a thinned portion 122 by means of a nut 30.

Consequently, in the wheel of this embodiment, as well, the same function and advantage as those of the wheel of Embodiment 1 are provided.

Embodiment 3

A wheel of this embodiment is similar to Embodiment 1 except that a mounting construction of a decorative member 2 is different.

Figure 8:
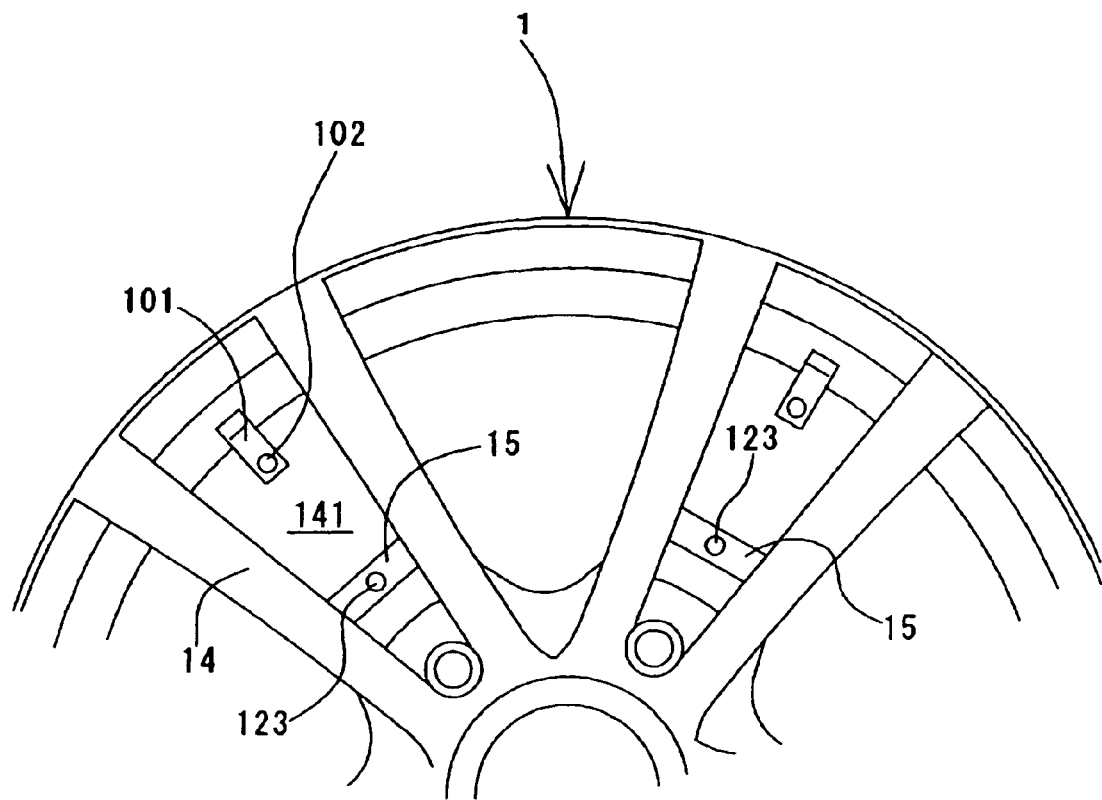
FIG. 8 is an enlarged front view of a wheel main body used in a wheel according to a third embodiment of the invention.

As is shown in FIG. 8, a bridge portion 15 suspended between a pair of spoke portions 14 is formed in first vent holes 141 of a wheel main body 1 in place of the thinned portions 122, and radially inward engagement holes 123 are formed in the bridge portions 15. Although illustration is omitted, a bolt member 3 which is fixed in a boss portion 22 of a decorative member 2 in a similar way to Embodiment 1 is inserted through the radially inward engagement hole 123, so as to be fastened to the bridge portion 15 by means of a nut 30. A bolt member 3 which is fixed in a boss portion 23 is fastened to a projection 101 in a similar way to Embodiment 1.

Consequently, also in the wheel of this embodiment, the same function and advantage as those of the wheel of Embodiment 1 are provided.

Embodiment 4

Figure 9:
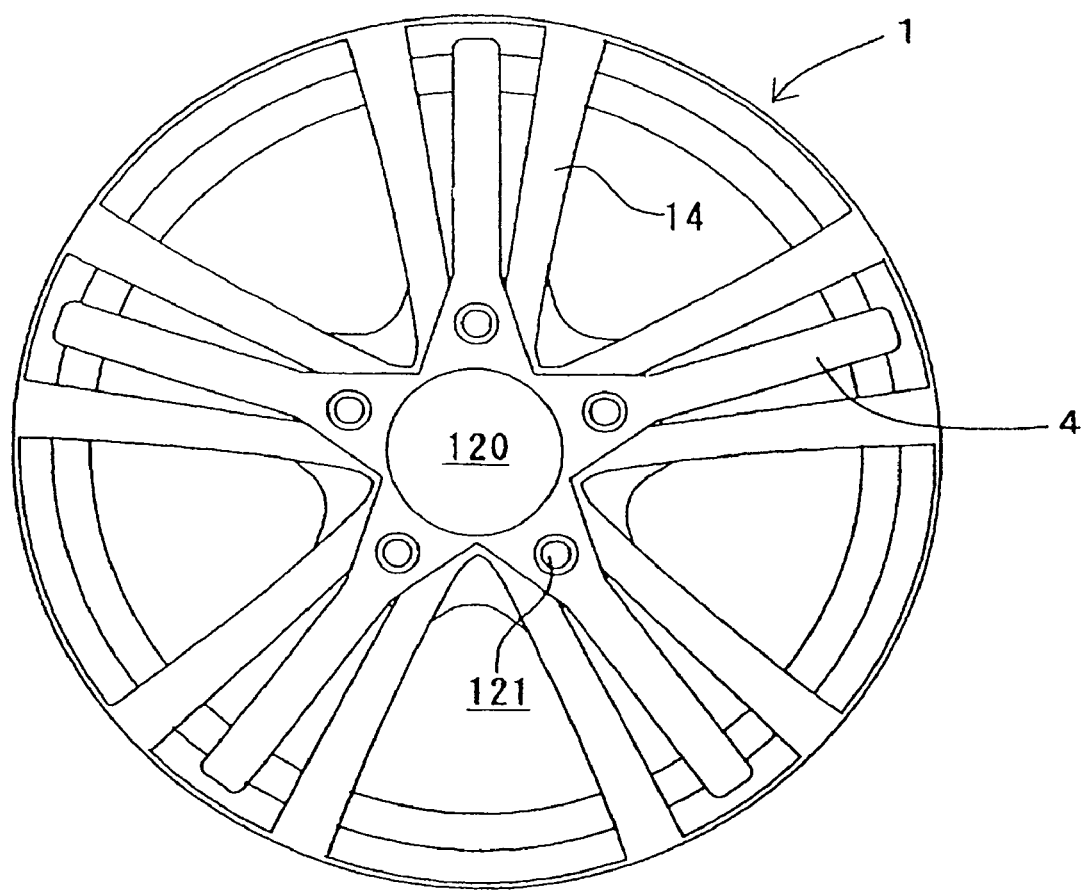
FIG. 9 is a front view of a wheel according to a fourth embodiment of the invention.
Figure 10:
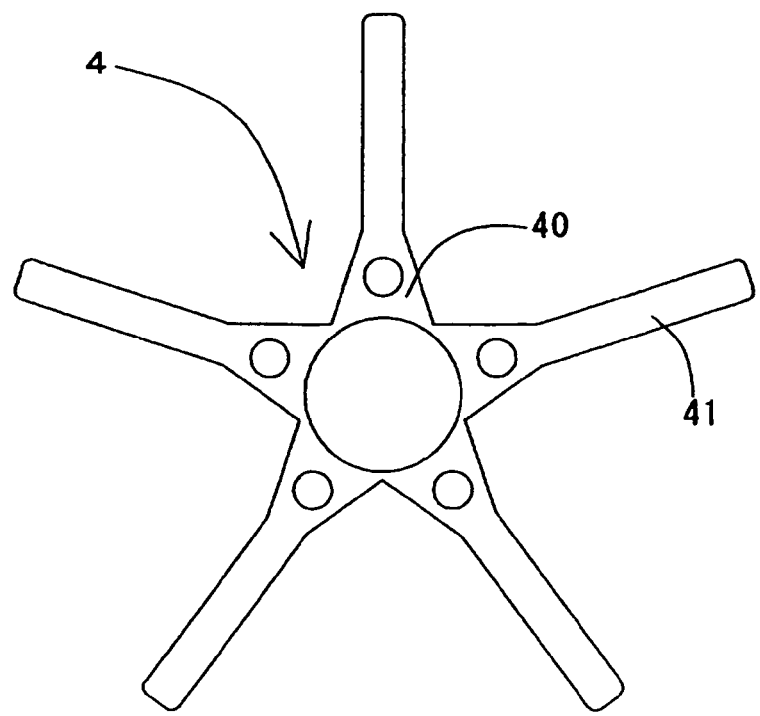
FIG. 10 is a front view of a decorative member used in the wheel according to the fourth embodiment of the invention.
Figure 11:
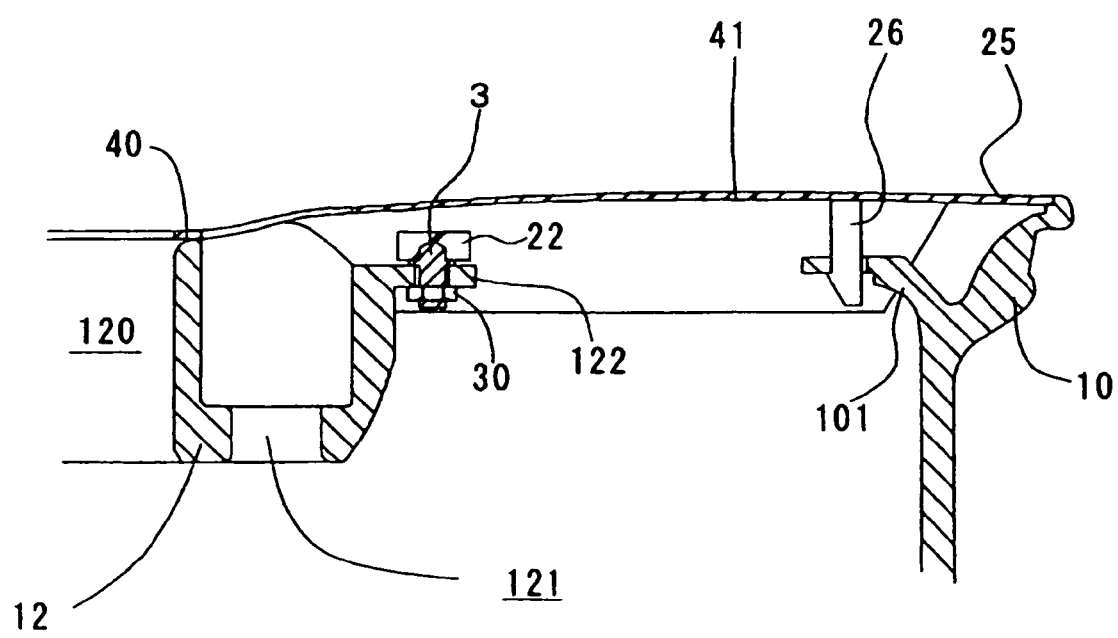
FIG. 11 is an enlarged sectional view of a main part of the wheel according to the fourth embodiment of the invention.

A wheel of this embodiment is shown in FIGS. 9 to 11. This wheel is made up of a wheel main body 1 which is similar to Embodiment 1 and a decorative member 4 made from a polycarbonate-ABS alloy resin. As is shown in FIG. 10, the decorative member 4 is made up of a central portion 40 which covers a hub portion 12 excluding a hub hole 120 and stud holes 121 and five arm portions 41 which project and extend radially from the central portion 40. The five arm portions 41 are each formed into a U-shape in cross section as with the decorative members 2 of Embodiment 1, and in a hollow portion, a rib portion 21, a boss portion 22, a flat plate portion 25, which are similar to those of the decorative member 2 of Embodiment 1, and a claw portion 26, which is similar to that of Embodiment 2, are formed in similar manners to Embodiments 1 and 2.

This decorative member 4 is disposed in such a manner that the five arm portions 41 cross longitudinally first vent holes 141, respectively, and by bolt members 3 fixed to the boss portions 22 being fastened in place in radially engagement holes 123 formed in thinned portions 122, the central portion 40 is fixed to the hub portion 12. On the other hand, in the five arm portions 41, the claw portions 26 formed at the distal ends thereof are locked, respectively, in radially outward engagement holes 102 in projections 101.

Consequently, also in the wheel of this embodiment, the same function and advantage as those of Embodiment 1 are provided, and the different design can be embodied at the hub portion 12.

Embodiment 5

Figure 12:
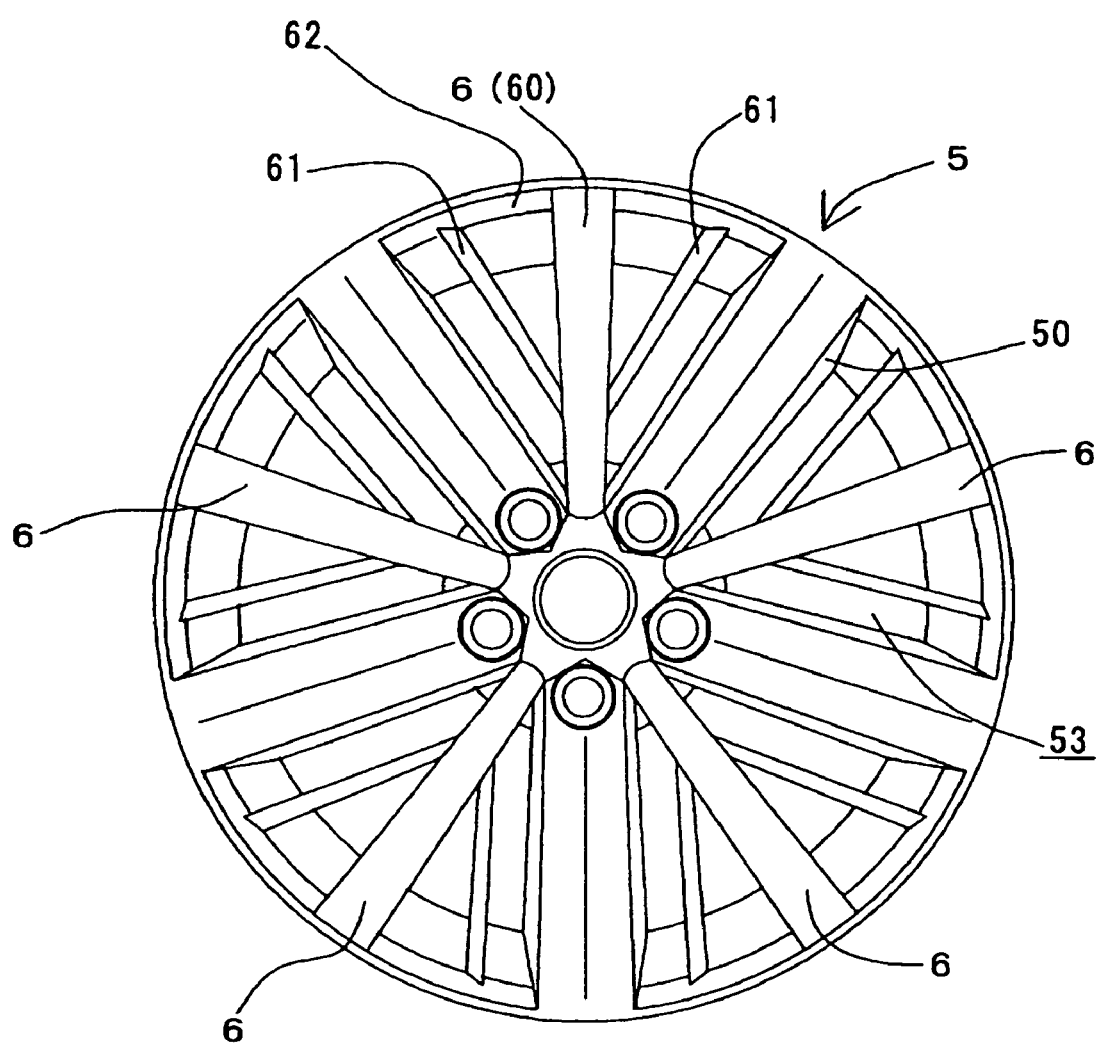
FIG. 12 is a front view of a wheel according to a fifth embodiment of the invention.
Figure 13:
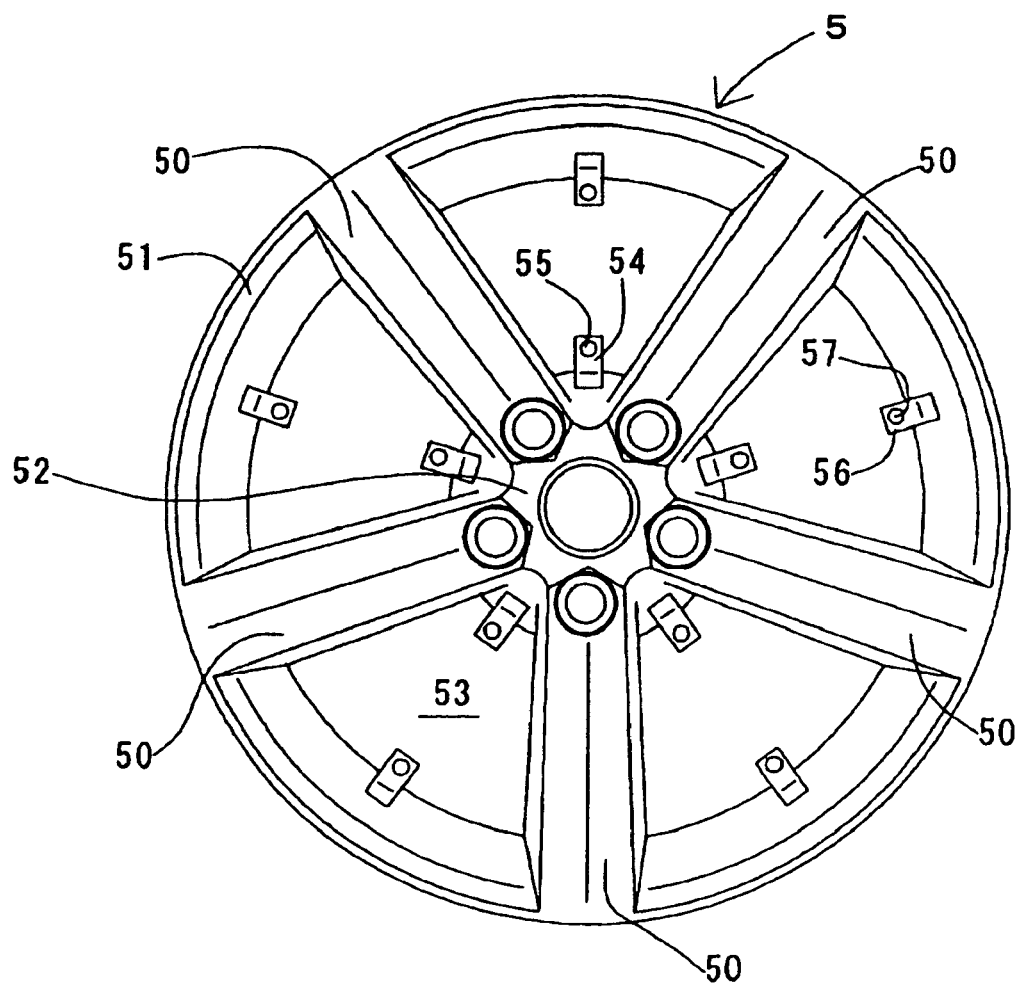
FIG. 13 is a front view of a wheel main body used in the wheel according to the fifth embodiment of the invention.
Figure 14:
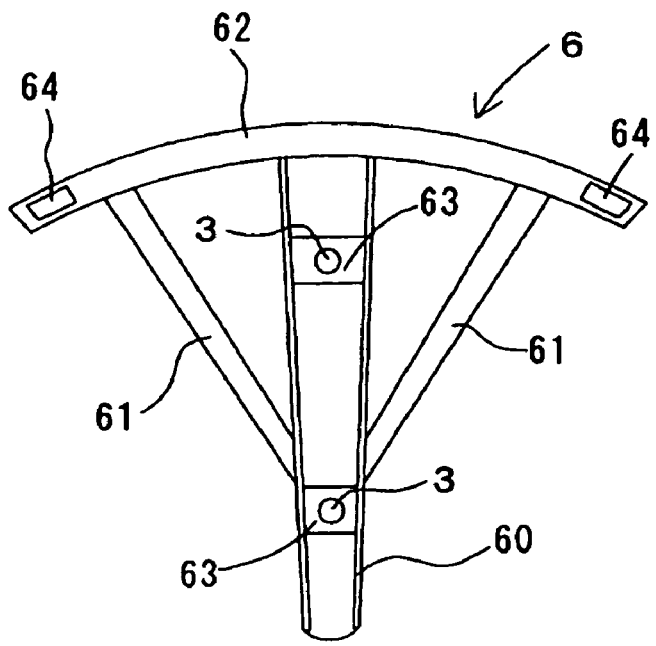
FIG. 14 is a front view of a decorative member used in the wheel according to the fifth embodiment of the invention.

A wheel of this embodiment is shown in FIGS. 12 to 14. This wheel is made up of an aluminum alloy wheel main body 5 and decorative members 6 which are formed from a polycarbonate-ABS alloy resin through injection molding.

A wheel main body 5 shown in FIG. 13 has five spoke portions 50 which connect a rim portion 51 with a hub portion 52, and vent holes 53 are formed between the respective spoke portions 50.

Projections 54 are formed which extend from the hub portion 52 radially outwards towards the vent holes 53, respectively, and radially inward engagement holes 55 are made to pierce distal ends of the projections 54 in a thickness direction (an axle direction). In addition, projections 56 are formed which extend from the rim portion 51 radially inwards towards the vent holes 53, respectively, and radially outward engagement holes 57 are made to pierce distal ends of the projections in the thickness direction (the axle direction). The projections 54 and the projections 56 extend on the same straight line in a radial direction of the wheel main body 5.

A decorative member 6 is disposed in each vent hole 53. As is seen from a back view thereof sown in FIG. 14, the decorative member 6 is made up of a trunk portion formed into a substantially U-shape in cross section having a hollow portion, a pair of branch portions 61 which extend from both sides of the trunk portion 60, and an arc portion 62 which connects the trunk portion 60 and the pair of branch portions 61 at distal ends thereof together, and surfaces of the trunk portion 60, the branch portions 61 and the arc portion 62 are treated by electrolessly plating to constitute a designed surface which exhibits a metallic gloss design.

As with the decorative member of Embodiment 1, boss portions 63 are formed between a pair of rib portions, not shown, on a rear surface side of the trunk portion 60. The pair of boss portions 63 are formed in such a manner as to be spaced away from each other in a longitudinal direction of the trunk portion 60, and as with Embodiment 1, a bolt member 3 is fixed to each boss portion 63. In addition, pressure sensitive adhesive double coated tapes 64 are affixed to a rear surface of the arc portion 62.

By the pair of bolt members 3 held to the trunk portion 60 being inserted through the radially inward engagement hole 55 and the radially outward engagement hole 57, respectively, the decorative member 6 is fixed in place by nuts 30 which are screwed onto the bolt members 3 from rear surface sides of the projection 54 and the projection 56. In addition, the arc portion 62 is affixed to an outer front surface of the rim portion 51 by means of the pressure sensitive adhesive double coated tapes 64.

Namely, according to the wheel of the embodiment, the decorative members 6 which have the same metallic gloss design as that of the spoke portions 50 are disposed in such a manner as to extend radially in the vent holes 53. Consequently, a unique spoke shape design is realized by the spoke portion 50 and the decorative portion 6. In addition, since the decorative members 6 are made from the resin, a reduction in weight can be attained compared with a case where the same design is all formed from an aluminum alloy, this thereby contributing to an improvement in fuel economy. Furthermore, since the projections 54 and the projections 56 are covered by the trunk portions 60 of the decorative members 6, the mounting portions are not visualized in any case from the front, and a high design property is provided.

In addition, since the decorative member 6 is fastened to the wheel main body 5 at the two locations, the decorative member 6 can withstand sufficiently a load exerted thereon while running, and the replacement thereof is facilitated. Additionally, the spoke portions 50 do not have to be thinned. Consequently, the degree of freedom in design is increased while maintaining the sufficient strength that the wheel should maintain. Furthermore, the decorative member can be made to have a high degree of freedom in coloring, and the wheel can be made to be a novelly designed wheel that cannot be obtained when a wheel is produced only through casting or forging.

Figure 15:
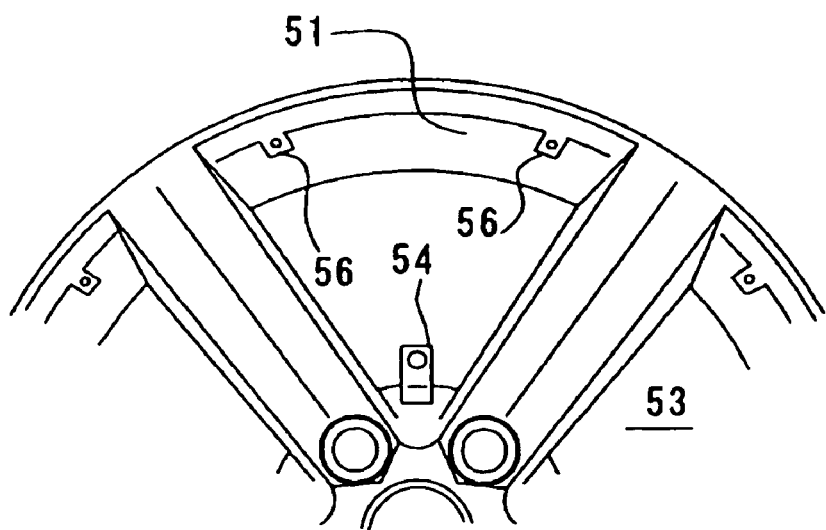
FIG. 15 is a front view of a main part of a wheel main body of another form used in the wheel according to the fifth embodiment of the invention.

In addition, in the embodiment, while the arc portion 62 is affixed to the rim portion 51 using the pressure sensitive adhesive double coated tapes 64, as is shown in FIG. 15, two projections 56 are formed which extend from the rim portion 51, and the arc portion 62 can be fixed to the projections 56 by means of bolt members 3 which are similar to Embodiment 1 or claw portions 26 which are similar to Embodiment 2.

Embodiment 6

Figure 16:
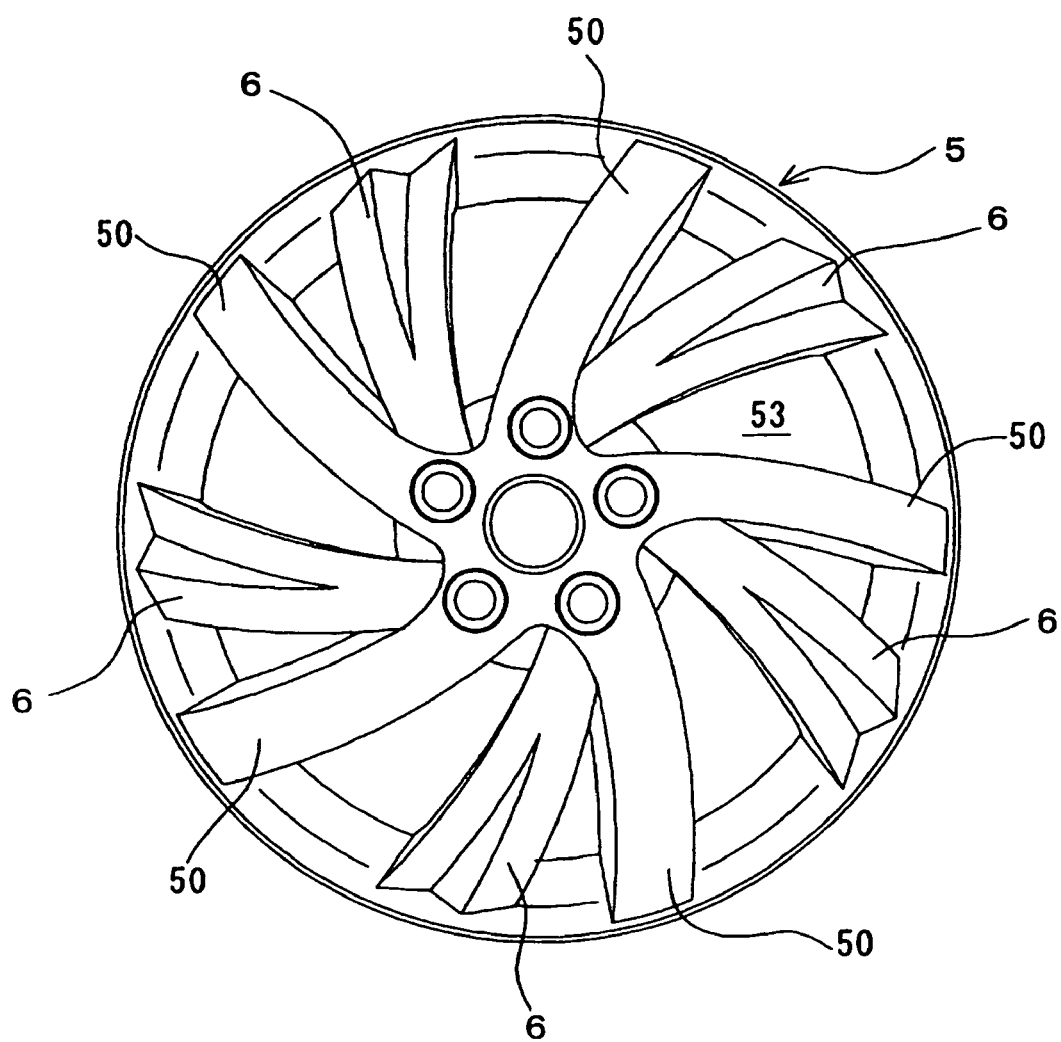
FIG. 16 is a front view of a wheel according to a sixth embodiment of the invention.
Figure 17:
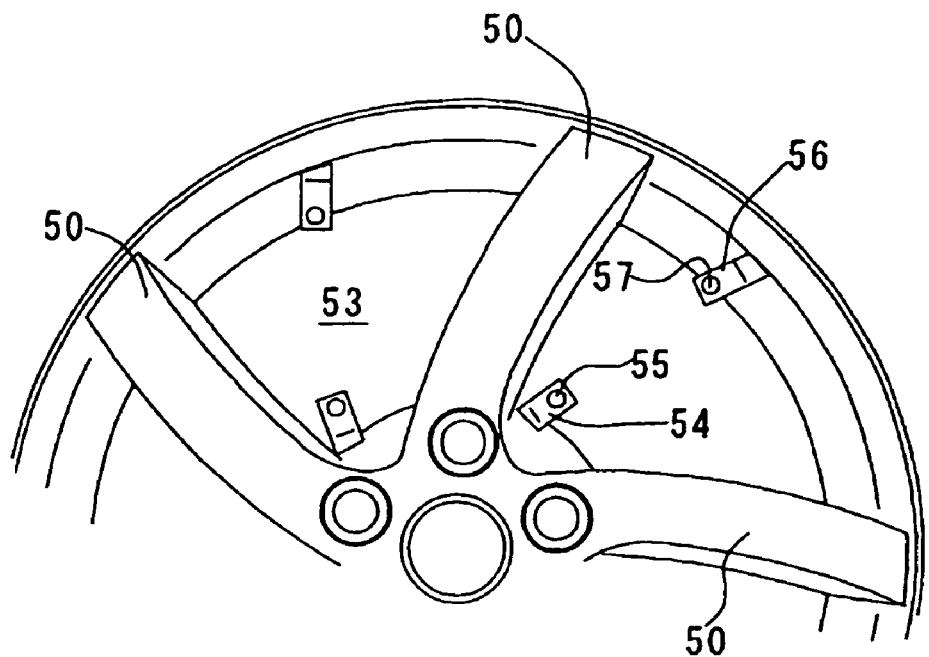
FIG. 17 is a front view of a main part of a wheel main body used in the wheel according to the sixth embodiment of the invention.
Figure 18:
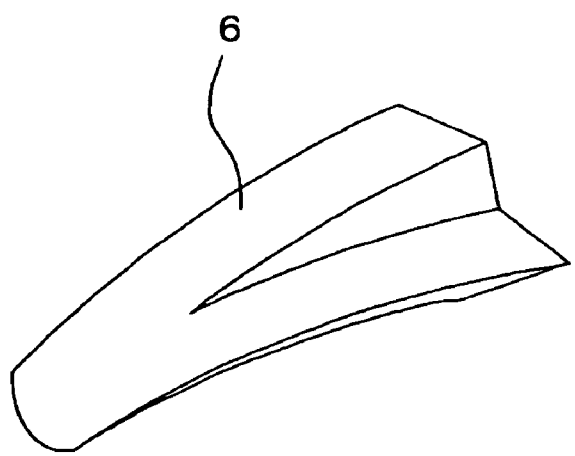
FIG. 18 is a front view of a decorative member used in the wheel according to the sixth embodiment of the invention.
Figure 19:
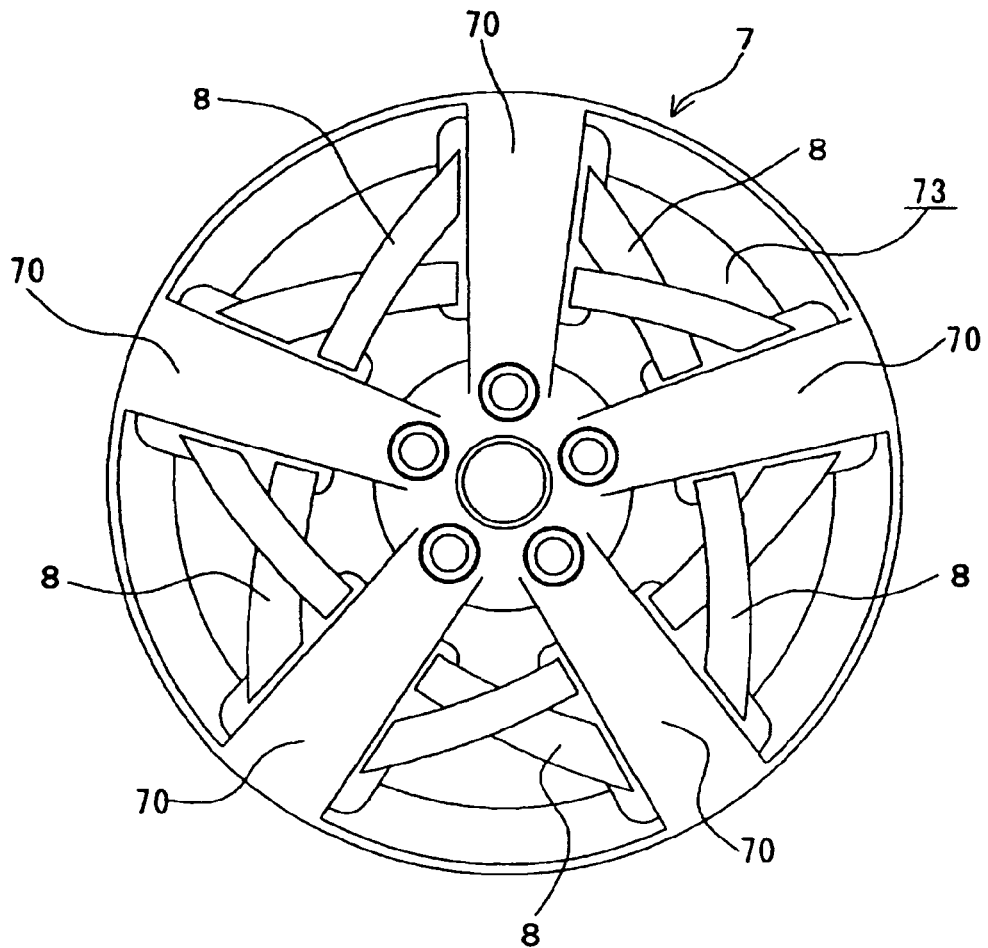
FIG. 19 is a front view of a wheel according to a seventh embodiment of the invention.

A wheel of this embodiment is shown in FIGS. 16 to 18. This wheel is made up of a wheel main body 5 made from an aluminum alloy and decorative members 6 which are formed from a polycarbonate-ABS alloy resin through injection molding.

The wheel of this embodiment uses a wheel main body which is similar to Embodiment 5 except that a spoke portion 50 is formed into an arc shape and that a projection 54 and a projection 56, which function as fixing portions, are formed as a pair in positions which confront each other at both ends while following a curved shape of the decorative member 6.

In addition, the decorative member 6 is similar to Embodiment 5 except that the decorative member 6 is formed into an arc shape having a stepped portion on a surface thereof, and bolt members, not shown, which are secured to a rear surface side thereof are inserted through a radially inward engagement hole 55 in the projection 54 and a radially outward engagement hole 57 in the projection 56, whereby the decorative member 6 is fixed in place by the bolt members being fastened by nuts, not shown.

Consequently, also in the wheel of the embodiment, the same function and advantage as those of Embodiment 5 are provided.

Embodiment 7

A wheel of this embodiment is shown in FIGS. 19 to 22. This wheel is made up of a wheel main body 7 made from an aluminum alloy and decorative members 8 which are formed from a polycarbonate-ABS alloy resin through injection molding.

Figure 20:
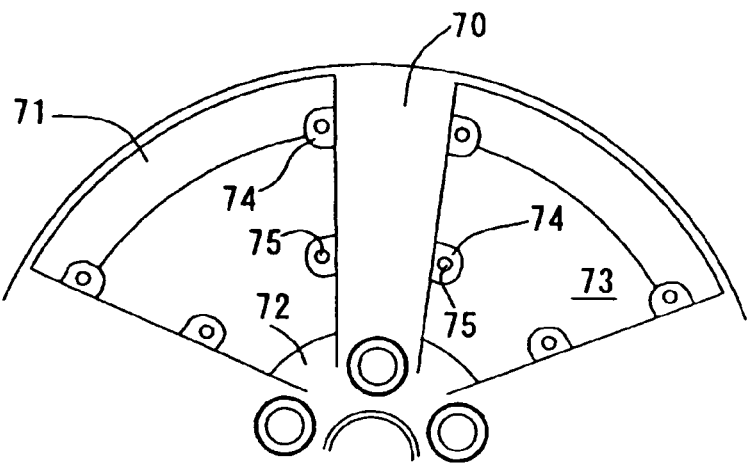
FIG. 20 is a front view of a main part of a wheel main body used in the wheel according to the seventh embodiment of the invention.

The wheel main body 7 shown in FIG. 20 has five spoke portions 70 which connect a rim portion 71 with a hub portion 72, and vent holes 73 are formed between the spoke portions 70, respectively.

Figure 22:
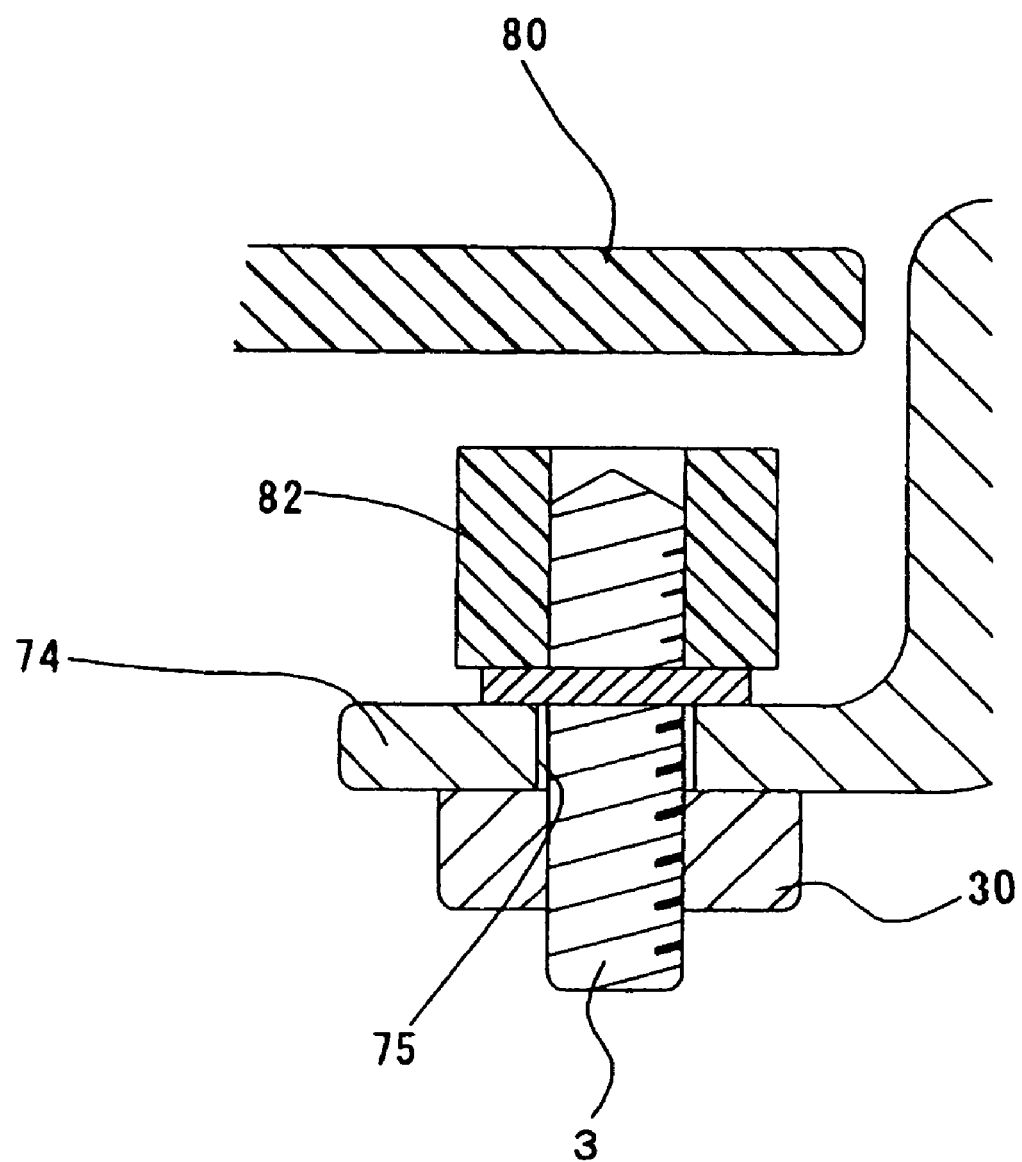
FIG. 22 is an enlarged sectional view of a main part of the wheel according to the seventh embodiment of the invention.

As is shown in FIG. 22 in an enlarged fashion, projections 74 are formed on both side surfaces of the spoke portion 70 in such a manner as to extend in a circumferential direction towards the vent holes 73, and engagement holes 75 are made to pierce distal ends of the projections in a thickness direction (an axle direction). The projections 74 are formed at a proximal end and a distal end of the spoke portion 70, respectively, and the projections 74 are formed in four in total the single spoke portion 70. In addition, the through hole 75 is formed in each projection 74.

Figure 21:
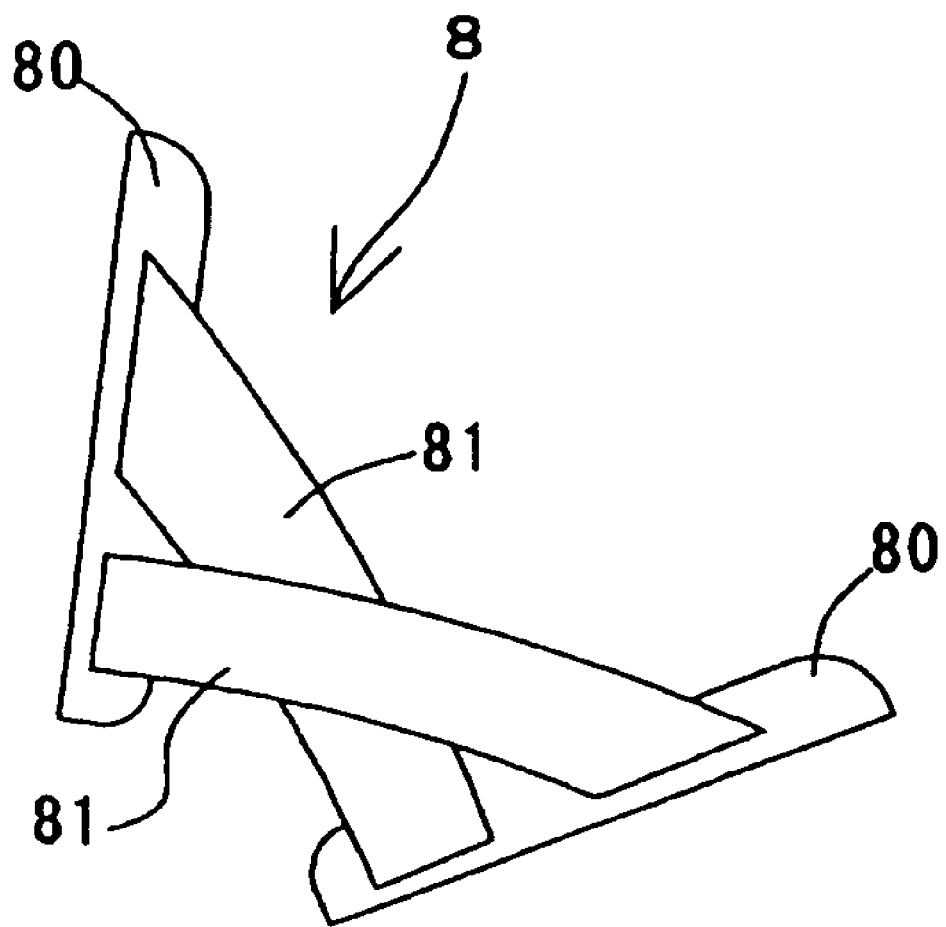
FIG. 21 is a front view of a decorative member used in the wheel according to the seventh embodiment of the invention.

The decorative member 8 is disposed in each vent hole 70. The decorative member 8 shown in FIG. 21 is made up of a pair of flat plate portions 80 and a pair of arc portions 81 which connect the pair of flat plate portions 80 together respectively and intersect each other, and surfaces of the flat plate portions 80 and the arc portions 81 are treated by electrolessly plating so as to constitute a designed surface which exhibits a metallic gloss design.

As is shown in FIG. 22, boss portions 82, which are similar to Embodiment 1, are formed on a rear surface side of each of the pair of flat plate portions 80, the boss portions 82 being formed as a pair in such a manner as to be spaced apart from each other in a longitudinal direction of the flat plate portion 80. A bolt member 3 is held to each boss portion 82. The decorative member 8 is fixed in place by the bolt members 3 being inserted through the through holes 75, respectively, and being fastened by nuts 30 from rear surface sides of the projections 74 in a similar manner to Embodiment 1.

Namely, according to the wheel of the embodiment, the decorative members 8 which have the same metallic gloss design as the spoke portion 70 are disposed in the vent holes 73. Consequently, a unique design is realized by the spoke portions 70 and the decorative members 8. In addition, since the decorative members 8 are made from the resin, a reduction in weight can be attained compared with a case where the same design is all formed from aluminum alloy, this contributing an improvement in fuel economy. Furthermore, since the projections 74 are covered with the flat portions 80 of the decorative members 8, the mounting portions are not visualized in any case from the front, this providing a high design property.

In addition, since the decorative member 8 is fastened to the wheel main body 7 at the four locations, the decorative member 8 can withstand sufficiently a load exerted thereon while running, and the replacement thereof is facilitated. Additionally, the spoke portions 70 do not have to be thinned, and the degree of freedom in design is increased while maintaining the sufficient strength that the wheel should maintain. Furthermore, the decorative member can be made to have a high degree of freedom in coloring, thereby making it possible to produce a novelly designed wheel that cannot be obtained when a wheel is produced only through casting or forging can be obtained in cooperation with the alloy wheel main body.

Note that while in the embodiment, the pair of flat plate portions 80 are formed on the decorative member 8, the decorative member 8 can be made up of only the pair of arc portions 81 without forming the flat portions 80. In this case, the boss portions 82 are formed at ends of the pair of arc portions 81.

This patent application is based on Japanese Patent Application (No. 2006-027333) filed on Feb. 3, 2006 and Japanese Patent Application (No. 2006-318737) filed on Nov. 27, 2006, the contents of which are incorporated herein by reference.

While the embodiments of the invention have been described, the invention is not limited to the matters described in the embodiments, and it is intended by the invention and falls within the scope thereof to be protected that the invention is modified and applied based on the description of the specification and the known techniques by those skilled in the art to which the invention pertains.

INDUSTRIAL APPLICABILITY

According to the invention, the vehicle wheel can be provided in which the degree of freedom in design is increased while maintaining strength and which has the novel design.

The invention claimed is:

1. A vehicle wheel comprising:
a rim, which is located at a periphery of the wheel;
a hub, which is located at the center of the wheel
a plurality of spokes extending between the hub and the rim, wherein a pair of adjacent spokes form a vent hole such that the vent hole is located between the spokes of the pair and is located radially between the hub and the rim; and
a decorative member made of resin, wherein the decorative member is fastened to the wheel and is located in the vent hole between the pair of adjacent spokes, wherein
fixing portions are formed on the wheel, and ribs are formed on the decorative member, and fasteners engage the fixing portions and the ribs to fasten the decorative member to the wheel, respectively,
the decorative member is substantially U-shaped in cross section, and the ribs cross a hollow portion of the U-shape, and
each of the fasteners engages a boss portion formed on a respective one of the ribs, and each rib and each boss portion is spaced apart from a bottom portion of the hollow portion.

2. A vehicle wheel as set forth in claim 1, wherein each boss is formed radially inward from an outer wall of the decorative member.

3. A vehicle wheel as set forth in claim 1, wherein the wheel has a projection that extends radially into the vent hole, and at least one of the fasteners is engaged with the projection.

4. A vehicle wheel as set forth in claim 3, wherein a thinned portion extends from the hub portion radially toward the vent hole, and at least one of the fasteners is engaged with the thinned portion.

* * * * *

UNITED STATES PATENT AND TRADEMARK OFFICE
CERTIFICATE OF CORRECTION

PATENT NO. : 7,841,670 B2
APPLICATION NO. : 12/656383
DATED : November 30, 2010
INVENTOR(S) : Kazuo Takeda et al.

It is certified that error appears in the above-identified patent and that said Letters Patent is hereby corrected as shown below:

Title page

Correct Item (73), as Assignee to read:

Toyoda Gosei Co., Ltd., Aichi-pref. (JP); Topy Kogyo Kabushiki Kaisha, Tokyo (JP)

Signed and Sealed this
Twenty-ninth Day of March, 2011

David J. Kappos
*Director of the United States Patent and Trademark Office*